Patented Sept. 7, 1937

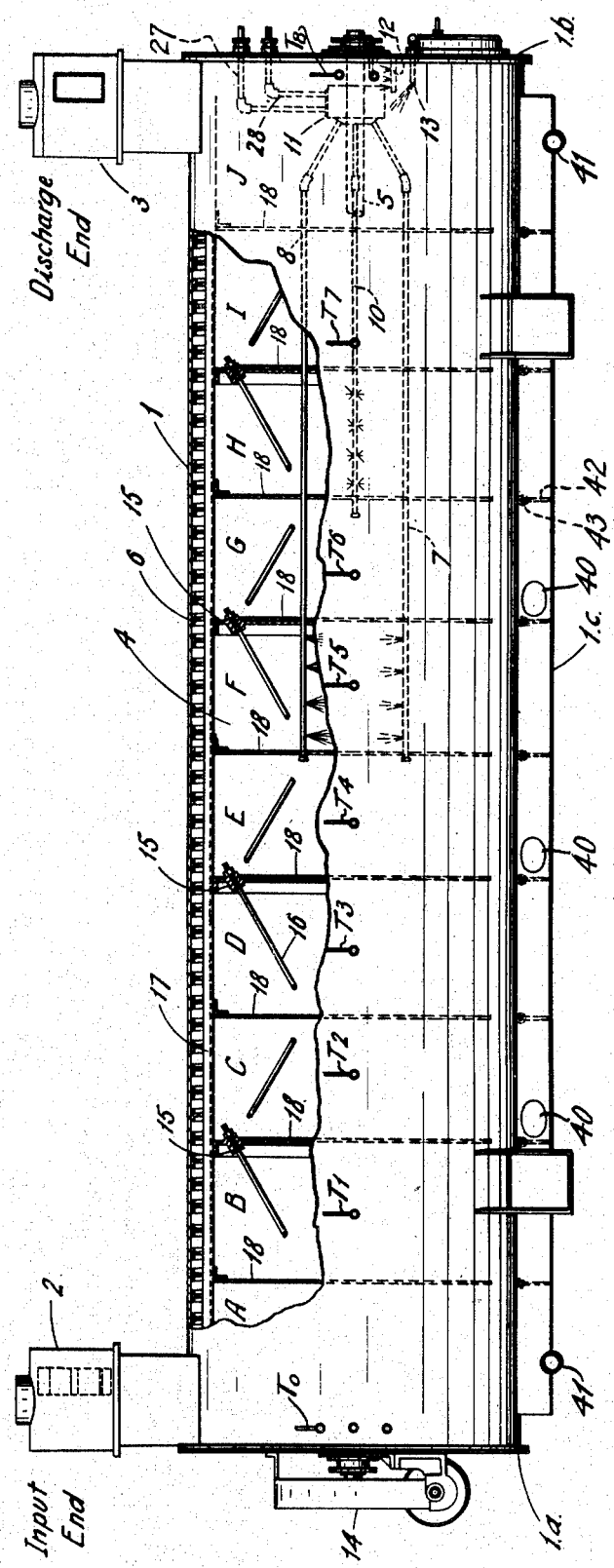
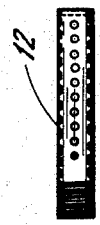

2,092,433

UNITED STATES PATENT OFFICE 2,092,433

APPARATUS FOR THE HEAT TREATMENT OF PACKAGED GOODS

Albert R. Thompson, San Jose, Calif., assignor to Food Machinery Corporation, San Jose, Calif., a corporation of Delaware Application May 20, 1935, Serial No. 22,414

9 Claims. (Cl. 126—272)

The present invention relates to apparatus for the heat treatment of packaged goods such, for example, as canned milk.

In the milk canning art, it is customary to pass the filled and sealed cans through a pre-heater before their introduction into the cooker or sterilizer. In the pre-heater, the temperature of the can and its contents is raised gradually so that the increase in temperature upon entry into the cooker will not be too sudden. The can, prior to its entrance into the pre-heater, is at a temperature of approximately 50 degrees. The temperature within that portion of the pre-heater into which the can is first introduced should be approximately 85 degrees, and as the can progresses through successive portions of the pre-heater, its temperature is raised gradually to approximately 210 degrees, the initial stages of pre-heating being more rapid than the final stages. In order to insure a product of the highest quality, it is essential that the temperature in the various portions of the pre-heater be controlled with considerable accuracy. Moreover, the temperatures must be adjusted from time to time to suit the characteristics of the particular milk which is being run. The duration of exposure of the can to the various temperatures in the pre-heating process is also important, best results being obtained by raising the temperature of the can comparatively rapidly in the initial stages of the process, and then holding it at or near the maximum temperature for a considerable time during approximately the last half of its travel through the pre-heater.

The can must not be subjected, at any time, to a too rapid increase in temperature. Over-heating the walls of the can with relation to the temperature of the contained milk, by increasing the outside temperature too rapidly, causes a condition known in the art as "burn on", in which a portion of the albumen in the milk is coagulated and deposited as a film on the inside of the can. In order to prevent this undesirable result, which impairs the quality of the product, the initial temperature in the input region of the pre-heater must not be too high, the increase in temperature during the first stage of pre-heating, although more rapid than during the final stage, must not be too rapid, and the temperature in the discharge region must be sufficiently high with relation to the temperature of the cooker into which the can is introduced upon its discharge from the preheater. Moreover, during the travel of the can through the pre-heater, it must not pass through a region of localized high temperature such as exists in proximity to the heating means, as this would also cause the objectionable "burn on" by temporarily over-heating the walls of the can. In other words, the heating means should be positioned as remote from the can path as possible.

The quality of the product will also be impaired by too much agitation of the cans during the preheating process, which results in separation of the milk solids, technically known as "grain". A small amount of agitation, however, is desirable in order to insure even heating.

In the hereinafter described embodiment of the present invention, I have provided a preheater having a can path of sufficient length to enable the entire pre-heating process to be carried to completion and in which the can path traverses a plurality of regions of controllable increasing temperature, the initial portion of the can path lying in a region of comparatively rapid increase in temperature, and the final portion of said path lying in a region in which the temperature increases at a much slower rate. I have also provided a pre-heater in which the heating means are positioned as remotely as possible from the can path, so that no portion of said path is subjected to unduly high temperature, and in which excessive and undesirable agitation of the cans is prevented.

Although the invention is herein illustrated and described as a pre-heater especially adapted for canned milk, it is to be understood that the principles of the invention may be embodied in machines for other purposes. It is also to be understood that changes within the limits of the claims hereto appended may be made in the form, construction and arrangement of the several parts herein shown and described.

The invention will now be described more in detail with reference to the accompanying drawings, wherein:

Figure 1 is a part sectional side elevation of a complete machine adapted for pre-heating canned products.

Figure 6 is an elevational view of a steam jet which is one of the details of the machine.

Figure 7 illustrates another form of steam jet which is likewise a constituent element of the machine.

Figure 2:
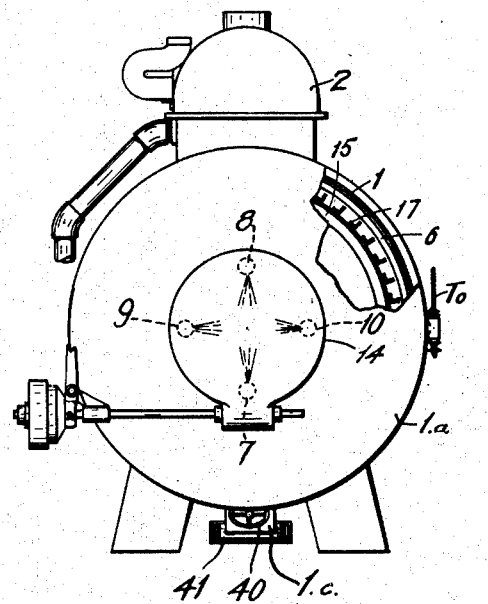
Figure 2 is a part sectional elevational view of the input and driving end of the machine of Figure 1.

The principal parts of the structure illustrated comprise a water tight cylindrical steel shell or tank 1, having at its input end a can feed device designated as a whole by reference numeral 2, and at its discharge end a can extractor 3; a rotary can reel 4; a shaft 5 for said reel extending from end to end of shell 1 and journalled in suitable bearings in the end plates thereof; a helically trending can track 6 of T-shape cross section attached to and following the interior periphery of the shell 1; steam pipes 7, 8, 9 and 10; a steam header 11; steam jets 12 and 13; a driving gear indicated at 14 for rotating the shaft 5 and the reel 4; and a series of thermometers $T_0$ to $T_8$.

The cylindrical shell 1 is provided with end plates 1a and 1b, and is formed with a longitudinally disposed sump 1c at the bottom, the function of which is to provide a place for dirt and debris to settle and to facilitate cleaning out any such matter which may in the course of time accumulate. Both the shell and the sump are provided with suitable clean-out openings 40, which are normally covered. Drain connections 41 are provided at both ends of the sump. The sump is also provided with interior transverse partitions or baffles 42 which are mounted to swing on pivots 43 to permit cleaning.

The shaft 5 is located at the longitudinal axis of the shell and to it are keyed several circular cast iron spiders 15 constituting the framework of the reel 4. The spiders are diagonally braced by means of rods 16; and equally spaced around their peripheries and attached to the spiders are a series of angle iron rails 17 which extend parallel to the axis of the reel. These rails are spaced peripherally to receive cans and they are located closely adjacent, radially, to the helically trending T-iron track 6, according to common practice in machines of this type.

The stream of cans to be passed through the unit enters through the can feed device 2 at the input end, travels in a helical path along the track 6 and emerges by way of the can extractor 3 at the discharge end of the unit.

The unit illustrated is divided longitudinally into a series of ten consecutive compartments, A to J, inclusive. These compartments are formed by means of circular imperforate plates 18 which are built into the reel and rotate therewith, and by the transverse partitions 42 of the sump, which are vertically aligned with said plates. The function of plates 18 and the partitions or baffles 42 is to prevent or substantially restrict inter-compartment circulation of water so that different temperatures can be maintained in different portions of the shell traversed by the can path.

In operation, the shell or tank 1 can be completely filled with water, but more generally it is filled to a level somewhat above the horizontal center line and high enough to keep the steam pipes and jets submerged at all times. When the unit is filled with cans, as is normally the case in operation, there is very little space between the can reel and the shell through which water can flow between adjoining compartments, and since there is no force tending particularly to force water through such crevices as may exist there is very little tendency for heat to be transferred between adjacent compartments except such as passes by conduction through plates 18 and shaft 5. Heat is conducted in this manner to a desirable extent, but not to such an extent as to cause anything like a uniform temperature from one end of the unit to the other.

Figure 3:
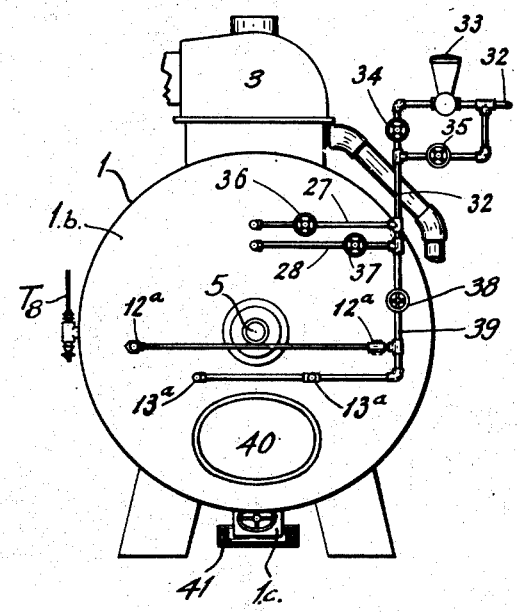
Figure 3 is an elevational view of the discharge end of the machine showing particularly the external steam pipe connections.

It will be observed that steam pipes 7 and 8 extend through compartments F, G, H, I and J, while steam pipes 9 and 10 extend only through compartments H, I and J. Steam pipes 7 and 8 are perforated at the portions included in compartment F, while steam pipes 9 and 10 are similarly perforated at points within compartment H. These perforations permit steam to emerge from the pipes, and they are preferably so disposed that the steam jets are directed toward the center of the shell. The steam jets, being located close to and directed toward the center, are remote from the can track, by virtue of which fact the emerging steam does not agitate the cans. This is one of the important features of this invention, since it avoids the formation of "grain" in the milk resulting from excessive agitation. Compartment J is supplied with steam by means of jets 12 and 13 which project through the end plate 1b from exterior pipe fittings 12a and 13a. These jets are illustrated in detail in Figs. 6 and 7, respectively. Both comprise short lengths of pipe plugged at their ends, but jet 12 has a row of perforations along one side, while jet 13 is cut at the end at an angle of about 45° and the plug therein provided with a single aperture. The apertures in both jets 12 and 13 are preferably so situated that the emerging steam will be directed toward the center of the shell to avoid agitation of the cans. As indicated in Fig. 3, there are preferably two jets 12 and two jets 13, suitably spaced in the end plate 1b.

Figure 4:
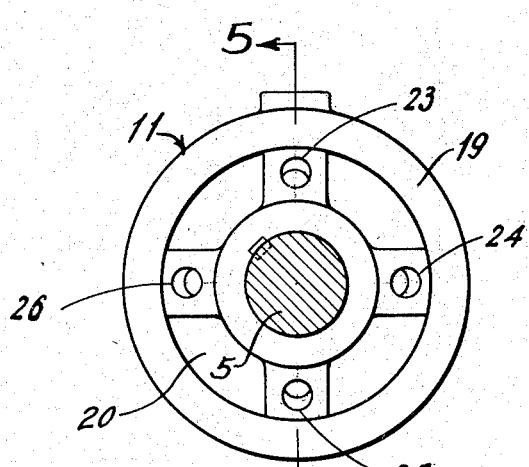
Figures 4 and 5 are enlarged end and sectional views, respectively, of a rotary steam header which is one of the details of construction of the machine, the sectional view of Fig. 5 being taken along the line 5—5 of Figure 4.
Figure 5:
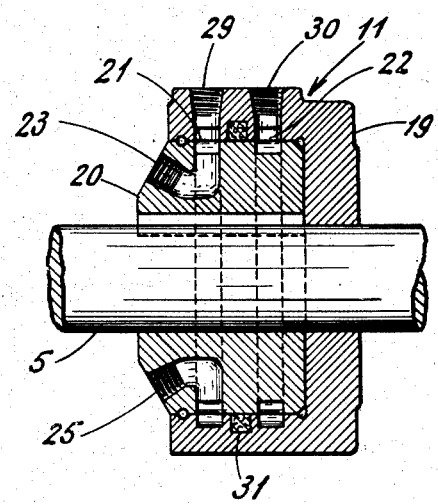

The steam pipes 7, 8, 9 and 10 are carried by the spiders 15 and plates 18 of the reel and must of necessity communicate with the external steam pipes through some means which will permit the delivery of steam thereto during rotation. This is accomplished by means of the steam header 11, which is shown in detail in Figs. 4 and 5. This device comprises a cast iron female member 19 and a cast iron male member 20. Member 19 is stationary, while member 20 is keyed to and rotates with shaft 5. The two members are correspondingly grooved to form annular steam channels 21 and 22, one of which is in communication with steam pipes 7 and 8 and the other in communication with steam pipes 9 and 10, these being threaded into the male member at tapped openings 23, 24, 25 and 26. Steam supply pipes 27 and 28 extend through end plate 1b and connect with steam channels 21 and 22 through tapped openings 29 and 30 respectively. Member 19 is provided with a packing groove 31 which contains a packing ring functioning as a steam barricade between channels 21 and 22 while permitting rotation of member 20.

Steam is supplied to the unit through a steam main 32 in which is preferably inserted an automatic regulator 33 in series with a shut off valve 34. There is preferably provided a bypass around the automatic regulator including a valve 35. This permits the regulator to be cut out of the line in event of its failure without interrupting the operation of the unit. The steam branch pipes 27 and 28 are each provided with a shut off valve 36 and 37, respectively, and a shut off valve 38 is provided in the branch pipe 39 leading to steam nozzles 12 and 13. These valves permit manual control of the steam delivered to the interior of the shell.

In the above described machine, steam is supplied directly to three compartments only, compartment F receiving steam from pipes 7 and 8, compartment H from pipes 9 and 10, and compartment J from jets 12 and 13. Compartments G and I receive sufficient heat by conduction from the adjoining directly heated compartments so that the temperature throughout the entire region F to J inclusive is approximately the same, or can, if desired, be made to increase slightly from F to J by manipulating the separate steam control valves 36, 37 and 38. Compartments A to E inclusive, forming the first half of the machine, receive heat by conduction from compartment F, the temperature of these initial compartments decreasing consistently from E to A. Thus the interior of the machine is provided with the desired range of temperature, lowest at the can input end, increasing rapidly to about the center, and thence holding or increasing slowly throughout the last half.

It is to be understood that the longitudinal arrangement of the heating means herein described is merely illustrative of the principle involved, and may be varied as required by circumstances. The essential principles, however, are that certain portions of the can path are directly and selectively heated, and that other portions receive no direct heating, but are heated indirectly from those portions which are directly heated. The temperatures throughout the entire can path are indicated by the thermometers T₀ to T₃, there being preferably one thermometer in each compartment. In operation, these temperatures are under constant observation, and are regulated as desired by selective control of the several direct heating means.

It is to be noted that there are no heating means in the sump 1c, or in any region near the periphery of the shell proximate to the can path. The position of the heating means near the axial region of the shell, remote from the can path, is important. It not only provides even distribution of heat, so that the cans are not subjected at any point to such unduly high temperature as would cause objectionable "burn on", as would be the case if the heating means were proximate to one portion of the can path, but it also avoids undue agitation of the cans tending to cause undesirable "grain" in the milk, as would ensue if they passed in proximity to the issuing steam jets, especially when said jets are under water, since the issuing steam agitates the water for a considerable distance. By positioning the jets in the axial region of the shell, and directing them inwardly, both excessively high temperature and agitation of the water are confined to a region remote from the can path.

I claim:

1. An apparatus for heat treating canned goods comprising a shell having a can inlet and a can outlet and an interior can path extending continuously from said inlet to said outlet, said path being confined to the outer region of said shell adjacent its walls, means for continuously advancing a succession of cans along said path, and a plurality of independently controllable steam pipes positioned in the central region of said shell remote from said can path, said pipes terminating in different regions in the length of said shell whereby the heating of said different regions may be independently controlled 2. An apparatus for heat treating canned goods comprising a shell having a plurality of compartments, means for advancing cans along a path extending successively through said compartments, direct heating means positioned within some of said compartments, the number of compartments provided with said heating means being less than the total number of compartments, and the remaining compartments being heated indirectly by conduction from the directly heated compartments, whereby the indirectly heated compartments are maintained at a lower temperature than the directly heated compartments.

3. An apparatus for heat treating canned goods comprising an elongated shell having a can inlet at one end and a can outlet at the other end, said shell having a plurality of interior compartments between its ends, means for advancing cans from said inlet to said outlet along a path extending successively through said compartments, and means for directly heating some of said compartments near the outlet end of the shell, the compartments near the inlet end being indirectly heated by conduction from the directly heated compartments, whereby the temperature of the several compartments is made to increase successively from the inlet end to the central portion of the shell, and to remain approximately constant from said central portion to the outlet end.

4. An apparatus for heat treating canned goods comprising a water containing shell having a can path extending therethrough, a plurality of means within said shell for heating the water therein, said heating means being positioned respectively in different regions of said shell and all said heating means being remote from said can path, means for separately controlling said heating means, and means for restricting thermal circulation of the water within said shell, whereby different temperatures may be maintained in the various regions surrounding the various heating means.

5. In combination, a tank having inlet and outlet openings, a helical can-way in said tank, a rotary reel within the helical can-way and coacting therewith for moving cans therethrough, partitions within and moving with the reel for dividing the interior of the space surrounded by the can-way into compartments defining zones of various degrees of heat, and a steam conduit disposed within said reel, said conduit having a steam discharge opening within one of said compartments for the direct heating thereof, the other compartments being indirectly heated by conduction from said directly heated compartment.

6. An apparatus for heat treating canned goods comprising a cylindrical heating shell having inlet and outlet openings, means defining a helical can-path extending from said inlet opening to said outlet opening within said shell, a rotatable reel within said shell and coacting with said means to move cans in a continuous stream along said helical can-path from said inlet to said outlet openings, said reel including a plurality of imperforate partitions adapted to rotate therewith and to divide the space within said spiral can-path into a plurality of heat zones, and a plurality of steam heating pipes disposed within said reel and extending lengthwise thereof, said pipes being adapted to revolve with said reel about the axis of rotation thereof.

7. An apparatus for heat treating canned goods comprising a shell having a can inlet and a can outlet, a helical can track within said shell extending continuously from said inlet to said outlet, a rotatable can propelling reel within said track for continuously advancing a procession of cans along it, a plurality of independent steam pipes carried by said reel for heating respectively different regions of the interior of said shell, a swivel connection common to all said pipes, said swivel connection being coaxial with said reel and having separate steam passages with which said pipes are respectively connected, and independently controllable pipes leading respectively to said passages from the outside of the shell for supplying steam independently to said reel carried pipes.

8. An apparatus for heat treating canned goods comprising a shell having an annular canway therewithin, means for advancing cans along said canway, and a plurality of steam pipes positioned within said canway and extending longitudinally thereof in spaced relation to the axis of the canway, said steam pipes having discharge apertures directed toward the axis of said canway whereby to require the steam to travel from its point of discharge a distance greater than the radius of said canway before striking the cans therein.

9. An apparatus for heat treating canned goods comprising a shell having an annular canway therewithin, means for advancing cans along said canway, and steam discharging means within said canway, said steam discharging means having a discharge aperture positioned between the canway and its axis and directed toward said axis, in order that the steam discharged from said aperture must travel through a distance greater than the radius of said canway before striking the cans therein.

ALBERT R. THOMPSON.